United States Patent
Lackey

[11] 3,864,578
[45] Feb. 4, 1975

[54] MULTIPLEX SYSTEM FOR A VEHICLE

[75] Inventor: Robert P. Lackey, North Attleboro, Mass.

[73] Assignee: Texas Instruments Incorporated, Dallas, Tex.

[22] Filed: Dec. 26, 1973

[21] Appl. No.: 428,289

[52] U.S. Cl. ............. 307/10 R, 307/147, 340/52 F, 340/184, 340/201
[51] Int. Cl. ........................................... G08c 15/12
[58] Field of Search .......... 340/52 F, 52 R, 27, 179, 340/180, 181, 182, 183, 184, 201, 203; 307/10 R, 10 LS, 147

[56] References Cited
UNITED STATES PATENTS
3,651,454  3/1972  Venema et al. .................... 340/52 F

*Primary Examiner*—Herman J. Hohauser
*Attorney, Agent, or Firm*—Harold Levine; John A. Haug; James P. McAndrews

[57] ABSTRACT

A multiplex system for controlling operation of vehicle components such as windshield wipers, turn signals, and cornering lamps responsive to the positioning of respective corresponding operator actuatable controls. This system includes an encoding means responsive to the position of each of the controls to provide a timing signal and also a code signal having signal components corresponding to the respective positions of each of the controls. A decoding means, remote from the encoding means, is responsive to the signals selectively to provide a plurality of respective outputs in response to the respective code signal components. Both the encoding means and the decoding means have standby modes of operation wherein they draw no significant power. The system also includes relay means respectively responsive to the outputs of the decoding means for selectively energizing each of the vehicle components whereby the operator actuatable controls control energization of corresponding vehicle components.

26 Claims, 8 Drawing Figures

MULTIPLEX SYSTEM FOR A VEHICLE

BACKGROUND OF THE INVENTION

This invention relates generally to multiplex systems and more particularly to such systems for controlling vehicle components such as windshield wipers, turn signals and cornering lamps, etc.

Vehicle components such as windshield wipers, turn signals, brake lights, etc., have typically been connected to corresponding operator actuatable controls by individual conductors which were grouped in wire harnesses. However as the number of comfort and safety components have increased, the complexity of corresponding wire harnesses have increased to the point where today certain runs, such as through the steering column and behind the instrument panel, are so filled with wires that vehicle assembly is difficult and expensive. With such a packing density, trouble shooting to find a failed wire in a harness is very time consuming; and once that wire is isolated, replacement requires extensive disassembly of the vehicle. Also since these wires often carry substantial current to energize certain vehicle components, wire diameter may be relatively large.

Because of these difficulties in vehicle wiring systems in which corresponding controls and components are connected by individual conductors, automotive multiplexing systems have been proposed to reduce the number and size of wires running through previously high wire density areas. Such a system is described in U.S. Pat. No. 3,651,454. However, such systems typically provide a clock or timing signal even when the vehicle is not in use and this constitutes an undesirable and continuous drain on the battery. Also, such systems typically generate timing signals at more than one location. More specifically, they require one shot multivibrators at their decoders thus requiring several large capacitors for timing functions and these capacitors can not be incorporated in inexpensive integrated circuit chips. Finally these systems have not provided for the detection of failure in one or more of the vehicle components (such as a burned out brake lamp) and supplied a warning thereof to the operator.

SUMMARY OF THE INVENTION

Among the several objects of this invention may be noted the provision of an improved vehicular multiplex system which greatly reduces the number and size of conductors running between operator actuatable controls and corresponding vehicle components; the provision of such a system which avoids any significant continuous drain on the vehicle's battery; the provision of such a system which warns the operator in case of failure of certain vehicle components; the provision of such a system which utilizes a single timing signal generator and thereby greatly reduces the number of circuit elements which cannot be incorporated in integrated circuit chips; the provision of such a system which employs high reliability solid-state components incorporated in inexpensive integrated circuit chips; and the provision of such a system which has long service life and is simple and economical to manufacture. Other objects and features will be in part apparent and in part pointed out hereinafter.

Briefly, a multiplex system of the present invention includes encoding means, decoding means, and relay means. The encoding means is responsive to the position of each of the vehicle's controls for providing a timing signal and a code signal having signal components corresponding to the respective positions of each of the controls. The decoding means is remote from the encoding means and is responsive to the signals selectively to provide a plurality of outputs in response to the respective code signal components. Both the encoding means and the decoding means have standby modes of operation wherein they draw no significant current. The relay means is respectively responsive to the outputs of the decoding means for selectively energizing each of the vehicle components whereby the controls control energization of corresponding vehicle components.

BRIEF DESCRIPTION OF THE DRAWINGS

Corresponding reference characters indicate corresponding parts throughout the several views of the drawings.

DESCRIPTION OF PREFERRED EMBODIMENT

Figure 1:
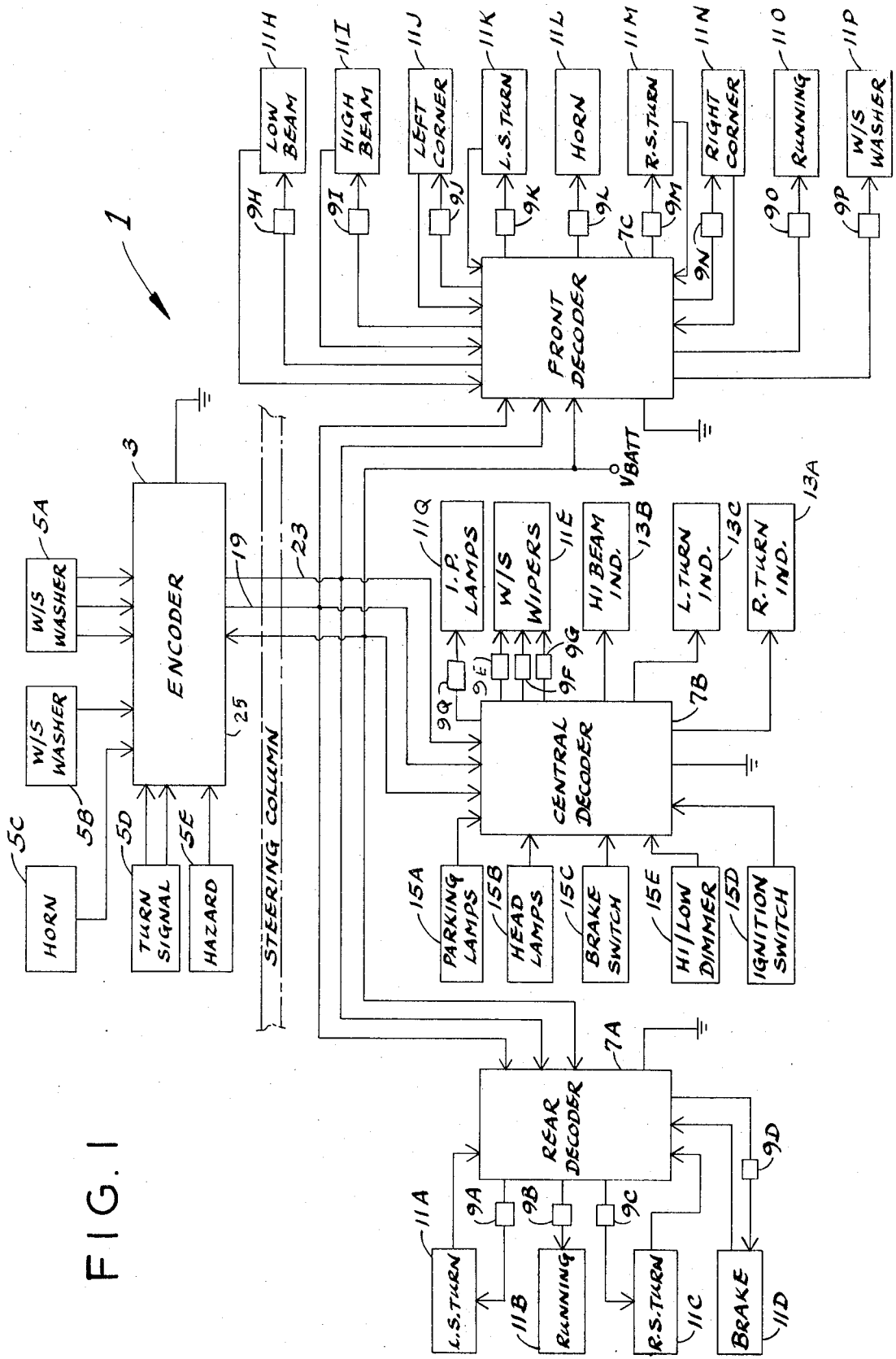
FIG. 1 is a block diagram of a vehicle multiplex system of the present invention.

Referring now to FIG. 1, a multiplex system for a vehicle is indicated generally by reference numeral 1. System 1 includes an encoder 3 which is preferably positioned at the head of the vehicle's steering column at or near the hub of the steering wheel. Encoder 3 is connected to be responsive to the positioning of each of a plurality of steering wheel located operator actuatable controls 5A–5E such as the horn control, the windshield wiper control, etc., and provides a timing signal and a code signal, the latter signal having signal components corresponding to the respective positions of each of the aforementioned operator actuatable controls and in addition having other signal components as will appear hereafter.

System 1 also includes a trio of decoders 7A, 7B, 7C which together comprise decoding means. Each is connected to receive the timing signal and the code signal. Decoders 7A, 7B and 7C are responsive to those signals selectively to supply a plurality of respective outputs in response to the respective code signal components. Finally, system 1 includes a plurality of high gain actuators 9A–9Q (which together comprise relay means) each of which is responsive to one of the outputs of the decoding means for selectively energizing one of a plurality of vehicle components 11A–11Q such as the horn, the various windings of the windshield wiper motor, the right side turn lamps, etc. Each of certain of the outputs of decoder 7B are directly connected to one of a series of vehicle components 13A–13C such as the instrument panel located right-turn indicator lamp, the instrument panel located high headlight beam indicator lamp, etc. As will appear later, these vehicle components are low power and do not require a high gain actuator. Decoder 7B is connected to receive signals from a plurality of operator actuatable controls 15A–15E located other than at the steering wheel. Typical of such controls are the headlight dimmer switch and the ignition switch. That is, as long as the ignition switch is in its on position, the encoder will be on and generating the timing signal and the code signal. Decoders 7A and 7C are connected to receive feedback signals from certain of the aforementioned vehicle components, each signal indicating a failure in the corresponding vehicle component. As will appear hereafter, the various decoders are responsive to the signals from controls 15A–15E and responsive to the signals indicating a failed vehicle component, both to affect certain of the components of the code signal. Some of these operator-actuated controls connected to central decoder 7B are considered critical controls which turn on the encoder. These controls comprise 15A–D. That is, as long as a critical control is in its on position, the encoder will be on and generating the timing signal and the code signal. Preferably decoder 7A is positioned at the rear of the vehicle and controls operation of those vehicle components in the rear of the vehicle, while decoder 7B is located in the passenger compartment of the vehicle and controls energization of those vehicle components in the passenger compartment, and decoder 7C is positioned in the front portion of the vehicle to control operation of vehicle components located in the front portion of the vehicle. Encoder 3 and decoders 7A, 7B, 7C are connected to receive power ($V_{BATT}$) from the vehicle's battery (not shown).

Figure 2:
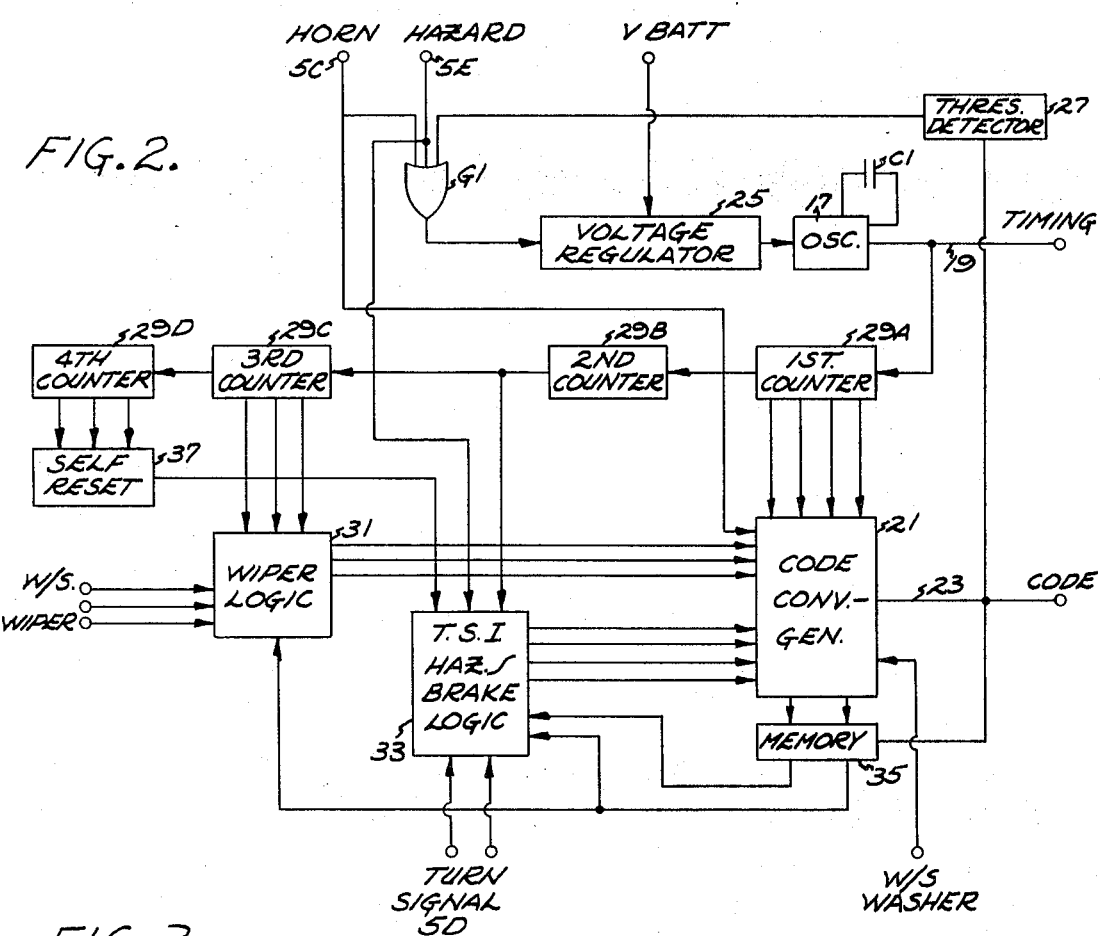
FIG. 2 is a block diagram of an encoder used in the multiplexer of FIG. 1.

As shown in FIG. 2, encoder 3 includes an oscillator 17, connected to a single timing capacitor C1, for supplying the timing signal on a timing line 19 and further includes a code converter-generator 21 for supplying the code signal on a code line 23. A voltage regulator 25 is connected to receive signals from horn control 5C, hazard warning control 5E, and a threshold detector 27 (which is connected to code line 23) all via an OR gate 61. Regulator 25, which also received $V_{BATT}$, is responsive to any one of the aforementioned signals to apply a regulated voltage, B+, to oscillator 17 and to other parts of the encoder circuitry as will be understood. A counting means which comprises a plurality of ripple counters 29A–29D connected in cascade is responsive to the timing signal for providing an encoder counting code. A logic means including a wiper logic circuit 31 and a turn signal-hazard warning-brake logic circuit 33 supplies a logic code. More specifically, logic circuit 31 is connected to receive that portion of the counting code supplied by counter 29C, signals from windshield wiper control 5A, and a first memory signal from a memory circuit 35 which receives inputs from generator 21 and which is connected to code line 23. Logic circuit 33 is connected to receive that portion of the counting code contributed by counter 29B, the signal from hazard warning control 5E, a signal from a self-reset circuit 37 which receives the portion of the counting code supplied by counter 29D, signals from turn signal control 5D, and both the first and a second memory signal from memory circuit 35. Finally generator 21 is connected to receive that portion of the counting code contributed by counter 29A; signals from operator actuatable controls 5C, 5B for the horn and the windshield washer, respectively; and the logic code and provides a control code to memory circuit 35 and the code signal on code line 23.

Figure 3:
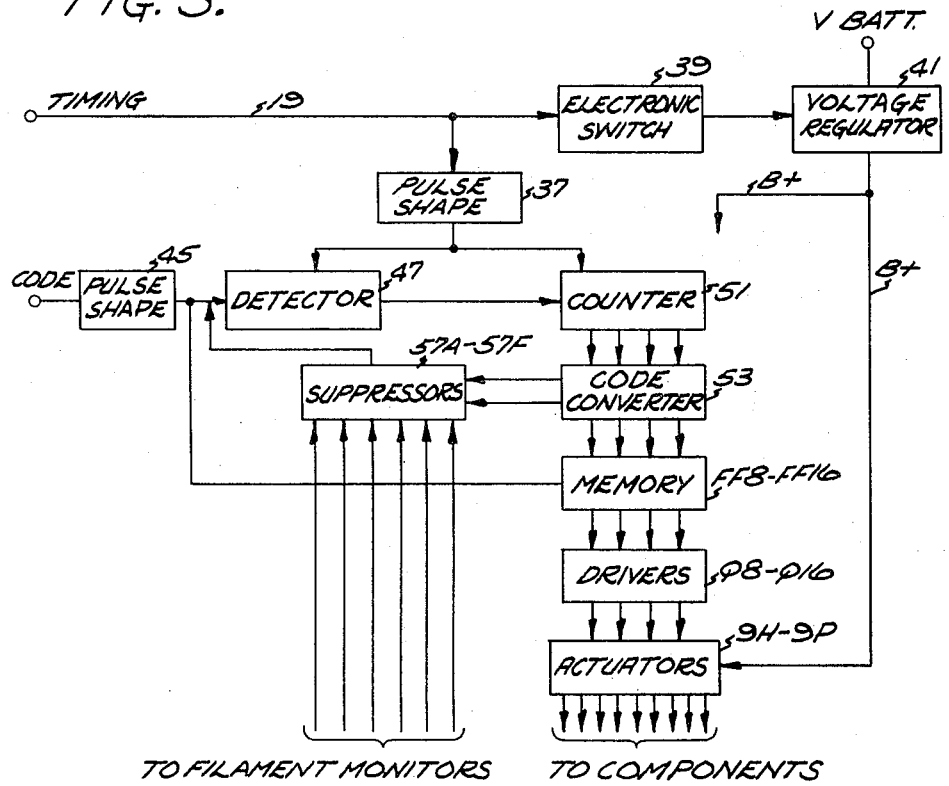
FIG. 3 is a block diagram of a decoder used in the multiplexer of FIG. 1.
Figure 4A:
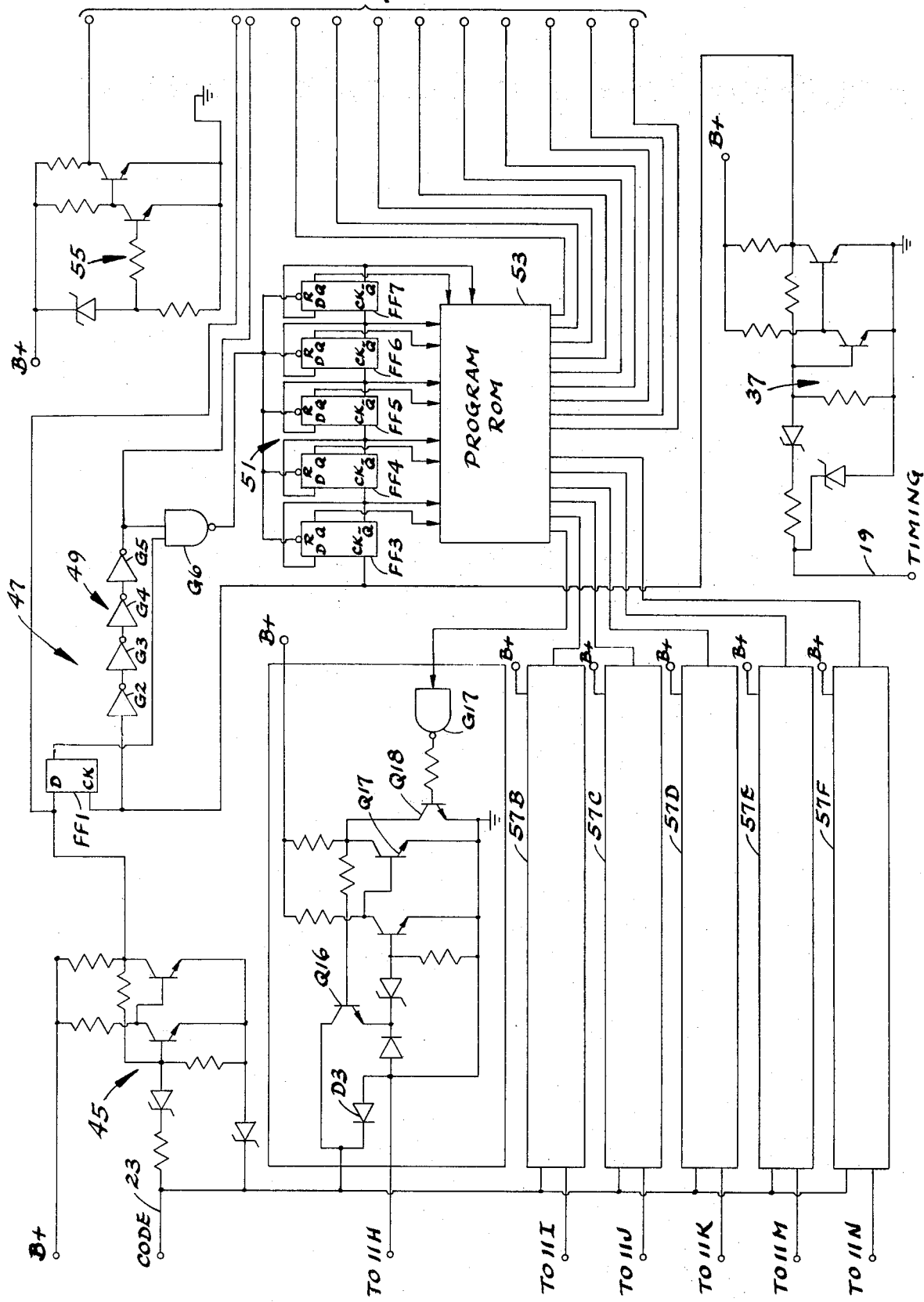
FIGS. 4A and 4B schematically illustrate components of the circuitry of FIG. 3.
Figure 4B:
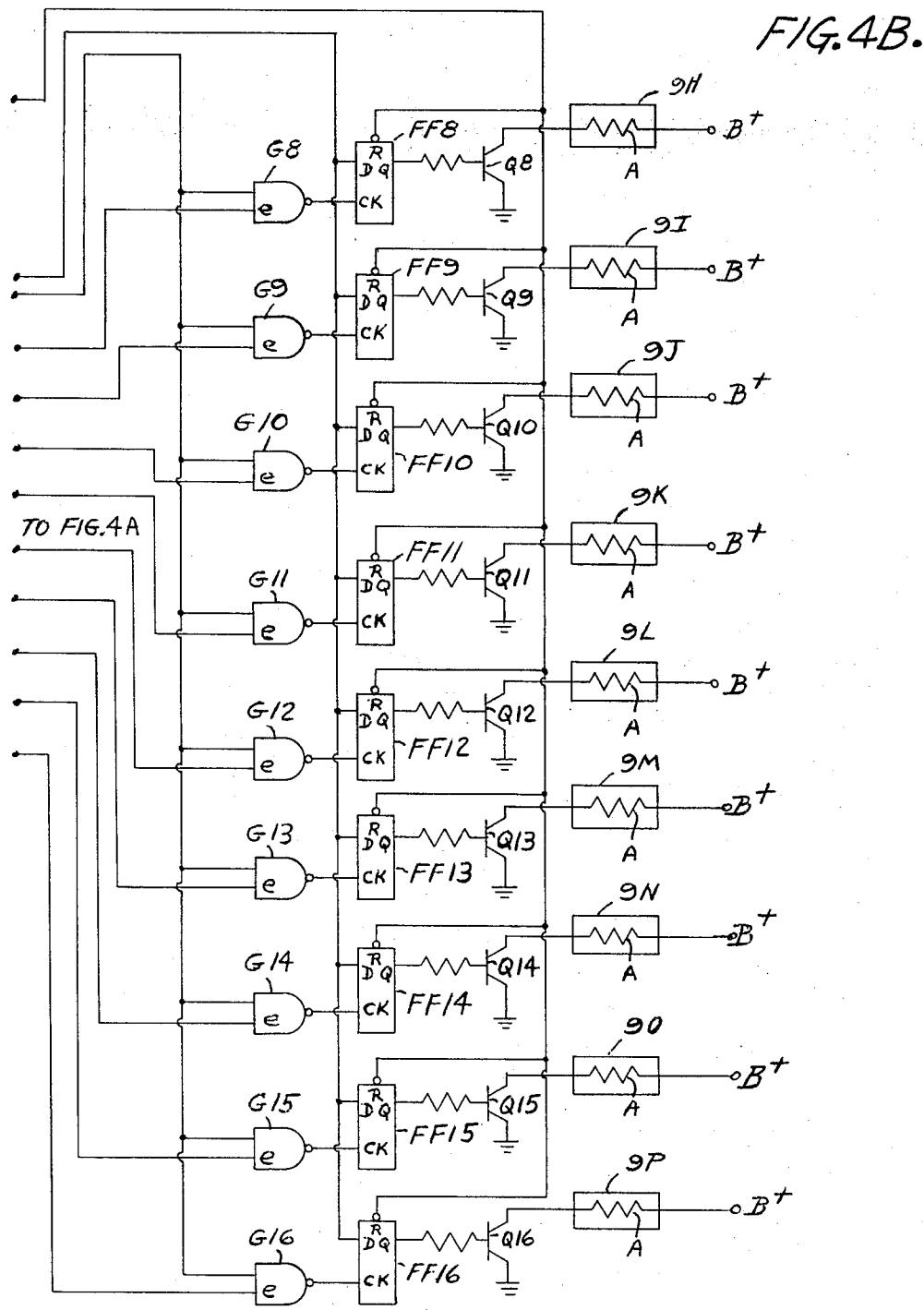

As all the decoders 7A, 7B, 7C are substantially identical, only front decoder 7C is shown in detail (see FIGS. 3, 4A–4B. Decoder 7C shown in FIG. 3 includes a first pulse shaping circuit 37 connected to timing line 19 for sharpening the timing signal and further includes a timing signal controlled electronic switch 39 which is responsive to the presence of the timing signal to turn on voltage regulator 41. Switch 39 and regulator 41 comprise regulated voltage generator means connected to $V_{BATT}$ and are of any conventional type. The voltage generator means supply a voltage B+ to the actuators and the components of decoder 7C as will be understood so that the voltage regulator means are not further described herein.

Decoder 7C also includes a second pulse shaping circuit 45 connected to code line 23 for sharpening the code signal. A decoder circuit 47 is responsive to both the sharpened code signal and the sharpened timing signal to provide a cycle start signal which indicates the start of a cycle of the code signal. Detector 47 includes a D type flip-flop FF1; a delay line 49 which comprises several serially connected NOT gates G2-G5; and a NAND gate G6 which is responsive to the outputs of the flip-flop and the delay line to provide the cycle start signal. A decoder counting means 51, which is constituted by a plurality of D type flip-flops FF3–FF7 connected to form a ripple counter, is responsive to both the cycle start signal (which is received at the respective R inputs of the flip-flops) and the sharpened timing signal and supplies a counting code. A code conversion means 53, comprising a read-only memory (ROM), is connected to receive the decoder counting code and provides a control code which comprises a plurality of individual signal components.

Further included in decoder 7C are a number of D type flip-flops FF8–FF16 which together comprise memory means. The D input of each of the flip-flops is connected to receive the code signal while each clock input is connected to receive one signal component of the control code via a corresponding NAND gate G8–G16. Each of these gates is also connected to receive the output of delay line 49. Each flip-flop receives a reset signal from a power-up reset generator 55 which is connected to receive B+. Each of a plurality of transistors Q8–Q16 is connected to receive a drive signal from the Q output of a corresponding flip-flop FF8–FF16. These transistors comprise driver means. The collector-emitter circuit of each transistor is series connected with the control element A of a corresponding high gain actuator 9H–9P from B+ to ground. As will be understood, the respective high gain actuators 9H–9P control energization of corresponding vehicle components 11H–11P. Construction and operation details of the high gain actuators will appear hereafter.

Finally, decoder 7C includes a plurality of data bit suppressors 57A–57F which are each connected to receive a feedback signal from a filament monitor circuit (not shown) in a corresponding vehicle component 11H–11K, 11M–11N. As will be understood, these filament monitor circuits serve to supply a feedback signal to a corresponding data bit suppressor if the filament in a corresponding vehicle component (e.g., the right side cornering light) has failed. The data bit suppressors in decoder 7C serve to affect the code signal in such a way, as will appear hereafter, that the operator is warned of the failed component. Suppressors are also included in the central decoder 7B but these suppressors serve a different function in that they are responsive to the positioning of certain operator actuatable controls 15A–15E to provide a turn-on signal to encoder 3. This will be explained further hereafter.

As suppressors 57A–57F are identical, only suppressor 57A is shown in detail. Connected in parallel from the output of the corresponding filament monitor circuit to code line 23 are a turn-on diode D3 and the collector-emitter circuit of a suppression transistor Q16. The collector-emitter circuits of a pair of transistors Q17, Q18 are parallel-connected from the base of transistor Q16 to ground through a resistor. Transistor Q17 is connected to conduct when no feedback signal is applied by the corresponding filament monitor circuit while the base of transistor Q18 is connected to receive one of the components of the control code via a NAND gate G17.

Figure 5:
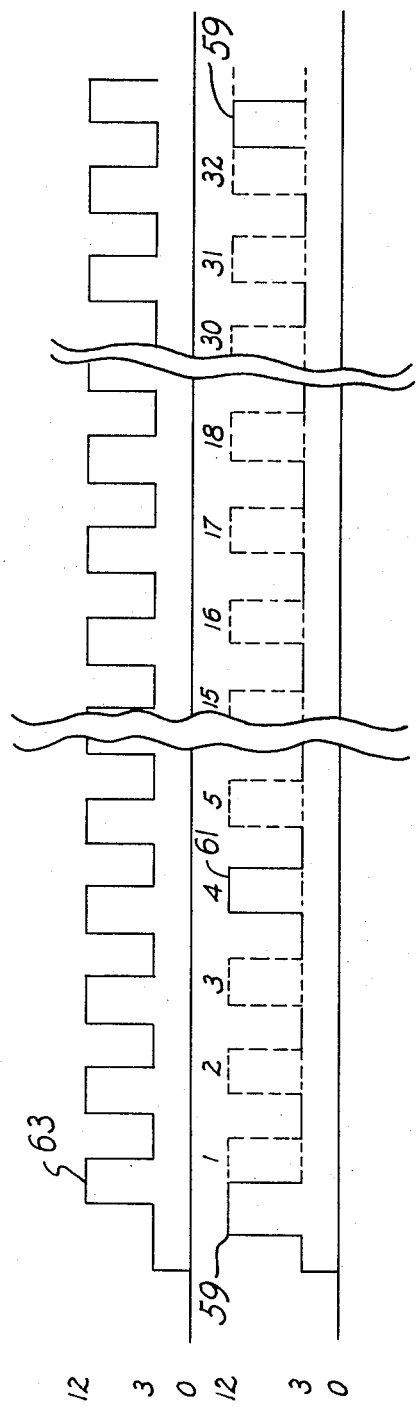
FIG. 5 shows a timing signal and a code signal such as those provided by the encoder of FIG. 2.

The waveforms of the timing signal and the code signal are shown in FIG. 5 with the top trace representing the timing signal. When encoder 3 is off, no signals are generated. However, when the encoder is turned on, oscillator 17 provides a d.c. level (preferably 3 volts) and shortly thereafter supplies a continuous pulse train superimposed on the d.c. level with the pulse amplitude preferably 12 volts. Similarly when the encoder is turned on, code converter-generator 21 provides a d.c. level (again preferably 3 volts) and shortly thereafter provides a synchronization pulse 59, superimposed on the d.c. level, which marks the start of each cycle of the code signal. Again, pulse amplitude is preferably 12 volts. The remainder of a cycle of the code signal is divided into 32 time slots each of which corresponds to one of the various vehicle components. The presence of a pulse (which is also superimposed on the 3 volt d.c. level and which has an amplitude of 12 volts) in a given time slot requires energization (or deenergization) of the corresponding vehicle component. For example, a pulse in time slot 1 requires the left front signal to come on, a pulse in time slot 2 requires the windshield washer to spray, etc. Of course, the various time slots also correspond to the operator actuatable controls and whether or not a pulse is generated in a particular time slot is a function of the positioning of the corresponding control. Thus the code signal is pulse number modulated, a form of pulse code modulation. Also the time slots of the code signal are time-coordinated with the pulses of the timing signal. More specifically, the time slots are one-half pulse width out-of-phase with the pulses of the timing signal. The first group of the time slots corresponds to vehicle components positioned in the front portion of the vehicle, the next group corresponds to vehicle components located in the passenger compartment, and the last group corresponds to vehicle components positioned in the rear portion of the vehicle.

Operation is as follows: When the various operator actuatable controls are in their "off" positions, encoder 3 and decoders 7A, 7B, 7C are in a standby mode of operation wherein the encoder generates neither the timing signal nor the code signal and wherein the encoder and the decoders draw no significant current from the vehicle's battery. Any slight current drawn is due merely to transistor leakage. When one of the "critical" operator actuatable controls located at the steering wheel (e.g., the horn control or the hazard warning switch) provides a signal, encoder 3 is switched from its standby mode of operation and starts providing the timing signal and the code signal. As will appear hereafter, actuation of any one "critical" operator actuatable control (15A–15D) connected to decoder 7B also takes the encoder out of its standby mode.

More specifically, if the horn control is actuated, it provides a signal causing voltage regulator 25 to turn on and supply B+ to oscillator 17 and to other parts of the encoder circuitry. Oscillator 17 is responsive to B+ and starts providing the timing code on line 19. This causes counters 29A–29D to operate and provide the encoder counting code to code converting-generator 21 which also receives the signal from the horn control. Generator 21 starts supplying the code signal which includes the synchronization pulse 59 and a pulse 61 which is generated in the fourth time slot which is assigned to the horn.

The voltage regulation means, which comprises electronic switch 39 and voltage regulator 41, is responsive to the presence of the timing signal to provide B+ and thereby switch decoder 7C out of its standby mode of operation.

With decoder 7C out of its standby mode, detector 47 provides an intermittent cycle start signal which indicates the start of a cycle of the code signal. Also power-up reset generator 55 provides a pulse causing all memory flip-flops FF8–FF16 to reset. When detector flip-flop FF1 has a logic 1 (Indicating the presence of a pulse in the code signal) at its D input at the same time the timing signal, which is received at the clock input of FF1, goes from logic 0 to logic 1, FF1 provides a logic 1 at its Q output. In other words, if a pulse is present on the code line at the leading edge of a pulse on the timing line, flip-flop FF1 provides a 1 output. Referring to FIG. 5, only synchronization pulse 59 is present at the leading edge of a timing signal pulse (63). Delay line 49 is employed to eliminate the possibility of obtaining an extra reset pulse when FF1 is toggled from the logic 1 to 0 state. When FF1 has a logic 1 at its input and the timing signal is present, gate G6 receives all logic 1 inputs and provides a reset signal to flip-flops FF3–FF7 in counter 51.

Having been reset, counter 51 starts increasing its counting code with every timing signal pulse. ROM 53 is responsive to the increasing counting code to sequentially supply enable signals to NAND gates G8–G16. More specifically, NAND gate G12 is the first of a chain of components that control energization of the vehicle's horn 11L. Also included in that chain are memory flip-flop FF12, driver transistor Q12, and high gain actuator 9L. ROM 53 is programmed to provide an enable signal to NAND gate G12 that is time-coordinated with the fourth time slot of the code signal. Since the horn control was actuated, pulse 61 is present in the fourth time slot which causes the D inputs of the various memory flip-flops FF8-FF16 to receive a logic 1 signal. However, only the clock input of flip-flop FF12 receives a signal from ROM 53 (via gate G12). This causes flip-flop FF12 to provide a logic 1 at its Q output. Driver transistor Q12 is responsive to this logic 1 signal and conducts causing energization of control element A of high gain actuator 9L. As will be understood, actuator 9L then causes energization of the horn by the vehicle's battery.

When the operator ceases to atuate horn control 5C, encoder voltage regulator 25, receiving no signal from gate G1, turns off and removes B+ from oscillator 17. This causes encoder 3 to go into its standby mode of operation. Because oscillator 17 no longer provides the timing code, electronic switch 39 in decoder 7C is turned off. This causes regulator 41 to shut off thereby to place decoder 7C in its standby mode of operation. Similarly decoders 7A and 7B go into their standby modes of operation.

Encoder 3 is responsive to signals from other critical operator actuatable controls which are not located at the steering wheel to switch from its standby mode of operation. These controls, 15A–15D, include the ignition switch and the headlight switch and provide their respective signals to central decoder 7B. More specifically, decoder 7B includes a number of data bit suppressors which are identical to the data suppressors 57A–57F of front decoder 7C. One central decoder data bit suppressor corresponds to each respective operator actuatable control 15A–15D. If encoder 3 is in its standby mode and ignition switch 15D is actuated, the switch povides a d.c. level (preferably three volts) to its corresponding data bit suppressor. Diode D3 in the suppressor applies that three volt level or turn-on signal to code line 23. Threshold detector 27 in encoder 3 is responsive to the turn-on signal and provides a signal to voltage regulator 25 via gate G1. This causes regulator 25 to provide B+ thereby switching the encoder from its standby mode of operation. Also oscillator 17 starts supplying the timing signal which results in the decoders switching from their standby modes of operation.

When the ignition switch 15D has been used to move the encoder out of its standby mode for providing the timing signal and the code signal, actuation of most of the noncritical controls adds pulses in corresponding time slots of the code signal. These noncritical controls include windshield wiper control 5A, turn signal control 5D, and windshield washer control 5B. When the windshield wiper control is actuated, wiper logic circuit 31 functions to interrupt and switch the windshield wiper pulses of the code signal which results in the interruption and switching of energization of the windshield wiper motor to cause proper wiper action. Similarly turn signal-hazard warning-brake logic circuit 33 functions to interrupt code signal pulses controlling energization of various lamps thereby to cause the desired flashing of the turn signals and hazard warning lights and also of corresponding instrument panel mounted indicator lamps. Self-reset circuit 37 operates to automatically cancel the turn signals after a predetermined time, approximately one minute. When the headlight switch 15B has been used to move the encoder out of its standby mode, actuation of the hi-lo dimmer switch 15E adds a pulse in the corresponding time slot of the code signal.

Suppose that turn signal control 5D is actuated so that left side turn signal 11K should be flashing. However, if this component has failed, a filament monitor circuit (not shown) in component 11K provides a d.c. level (3 volts) to data bit suppressor 57D in decoder 7D. Also, gate G17 of suppressor 57D receives an intermittent enable signal, which is one component of the control code, from ROM 53. More particularly, ROM 53 is programmed to provide an enable signal to suppressor 57D during the time slot of the code signal assigned to the left side indicator light which is located on the dashboard and controlled by decoder 7B. When ROM 53 provides the enable signal to gate G17 of suppressor 57D, gate G17 causes transistor Q18 to turn off. Similarly, the signal from the monitor circuit in component 11K causes transistor Q17 to stop conducting. With both Q17 and Q18 not conducting, data bit suppression transistor Q16 conducts and in effect connects code line 23 to the output of the filament monitor circuit in component 11K. This causes the code line to be held at a three volt level thereby to eliminate the pulse which would have turned off the left side indicator lamp. The result is that the left side indicator lamp on the dashboard remains steadily illuminated thereby to warn the operator that one of the left side turn signal lamps has failed. Thus, the system of this invention provides a form of reverse communication from the various decoders to the encoder in that a decoder has the capability to turn on the encoder and also has the capability to suppress one or more of the pulses of the code signal thereby allowing detection of the suppressed data bit by a different decoder.

In the system of the present invention, only two control wires, timing line 19 and code line 23, run between the steering wheel located encoder and the various remote decoders. Thus there is a great reduction in the number of wires running through the steering column as compared to previous wiring systems wherein each operator actuatable and the corresponding vehicle component were connected by individual conductors. In addition, the two control wieres may be of fine gauge because they carry very low power.

It should also be noted that encoder 3 can be incorporated into a single MOS integrated circuit chip except for one external timing capacitor C1 and certain transient voltage protection capacitors (not shown). Similarly, each decoder can be incorporated into a single bipolar integrated circuit chip with the exception of power transistors in the voltage regulator and filtering capacitors. The system generates a single timing signal rather than generating separate timing signals in the encoder and in each decoder which would require the use of many large timing capacitors which in turn require tracking of the resulting timing signals over temperature. Also, the system provides reverse communication between the decoders and the encoder as is required to warn the operator of a failed component, and has a standby mode of operation in which no significant power is drawn from the vehicle's battery.

Figure 6:
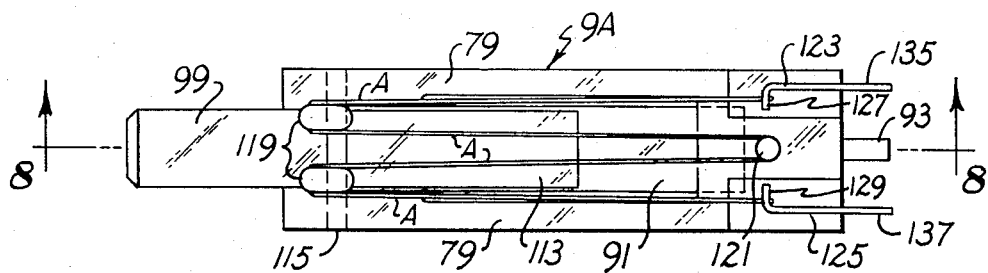
FIG. 6 is a plan of a thermal actuator such as is used with the multiplexer of FIG. 1.
Figure 7:
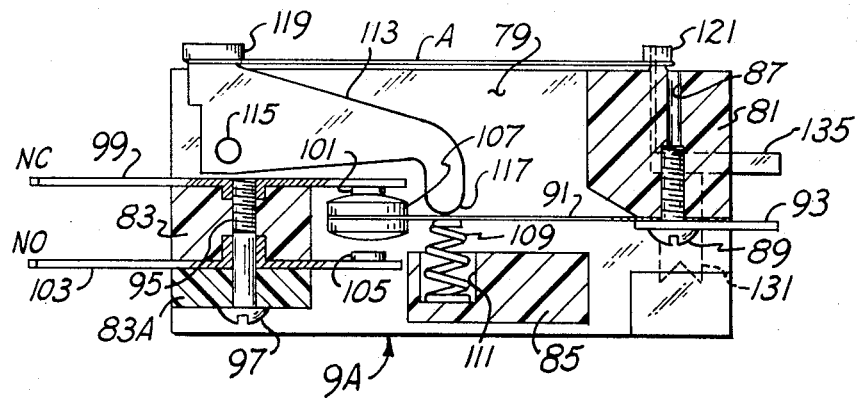
FIG. 7 is a section generally on line 7—7 of FIG. 6 with certain elements shown in elevation.

A high gain actuator or relay 9A, preferably used as an interface between the low power decoder drives and the relatively high power vehicle components, is shown in FIGS. 6 and 7. This relay comprises a frame, preferably molded from a thermosetting synthetic resin material, having a pair of spaced parallel sidewalls 79 with three bridging support portions 81, 83 and 85. Bridging portion 81 has a threaded bore 87 receiving a machine screw 89 to secure thereto one end of a switch arm 91 and a terminal 93. Bridging support 83 is provided with a doubly counterbored bore 95 which receives a shank of a machine screw 97, the tip of which is threaded into a terminal lug 99 carrying a contact 101 on an inner end thereof while the outer end serves as a normally closed (NC) terminal for the actuator or relay. Another terminal lug 103 is secured to the undersurface of support 83 by a retainer 83a against which the head of screw 97 bears. The inner cantilevered end of lug 103 carries another fixed contact 105 and the other end of lug 103 constitutes a normally open (NO) terminal for relay 9A. A double-faced contact 107 is mounted on the free end of switch arm 91 which is biased upwardly into engagement with contact 101 by a coil spring 109 seated in a well 111 of bridging support 85.

A bell crank 113 of electrical insulation material is mounted for pivotal movement about a pin 115 within the recess formed between sidewalls 79. A nose 117 constituting one end of the bell crank bears against the switch arm 91 on the surface opposite that against which the end of spring 109 acts. The other end of crank 113 has two integrally formed spaced tongues 119 projecting therefrom, while a similar tongue 121 is formed on the upper surface of support 81. Mounted on support 81 are two similar spaced terminal members 123 and 125 having upper arms, the outer ends of which serve as terminal posts 127 and 129, and legs 131 and 133 extending downwardly and secured to support 81. Members 123 and 125 have outwardly projecting ends 135 and 137 forming terminals for connection to a low level power source.

A thin wire A of a martensitic memory alloy, such as that formed of a selected nickel-titanium alloy referred to as Nitinol, has its opposite ends secured to terminal posts 127 and 129 and is trained around tongues 119 and 121 in four reaches. This wire, tensioned by spring 109 acting against the nose of crank 113 to rotate it counterclockwise, is a resistive control element, which when heated above a transition temperature by the passage of low level current, will quickly shorten because of a sudden change in its modulus of elasticity and overcome the biasing action of spring 109 to move switch arm 91 and cause contact 107 to engage contact 105. When the actuator or terminal relay wire A is electrically deenergized, it cools below its transition temperature and will revert to its original modulus of elasticity and thereby lengthen so as to permit contact 107 to disengage contact 105 and return to engagement with contact 101.

As shown in FIG. 4C control element A of relay 9L (identical to 9A) is series-connected with the collector-emitter circuit of transistor Q12 from B+ to ground. When the transistor receives a drive signal from flip-flop FF12, it conducts and energizes control element A. When element A reaches its transition temperature, contacts 107 and 105 close and, as will be understood, cause energization of one of the vehicle components by the vehicle's battery (not shown).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A multiplex system for controlling operation of vehicle components such as windshield wipers, turn signals, and cornering lamps responsive to the positioning of respective corresponding operator actuatable controls, said multiplex system comprising:

encoding means responsive to the position of each of said controls for providing a timing signal and a code signal having signal components corresponding to the respective positions of each of said controls, said encoding means having a standby mode of operation wherein said encoding means provides no signals and draws no significant current;

decoding means remote from said encoding means and responsive to said signals selectively to provide a plurality of respective outputs in response to the respective code signal components, said decoding means being responsive to the absence of at least one of said signals to go into a standby mode of operation wherein it supplies none of said outputs and draws no significant current; and relay means respectively responsive to said outputs of said decoding means for selectively energizing each of said vehicle components whereby said operator actuatable controls control energization of corresponding vehicle components without connection of each of said controls by individual conductors to said respective relay means.

2. A multiplex system as set forth in claim 1 wherein at least one of said operator actuatable controls includes means for providing a feedback signal, wherein said decoding means comprises means responsive to said feedback signal to apply a turn-on signal to said encoding means, and wherein said encoding means comprises means responsive to said turn-on signal thereby to switch said encoding means from its standby mode of operation.

3. A multiplex system as set forth in claim 2 wherein not more than one timing signal is generated and wherein said encoding means includes not more than one clock means for generating said timing signal and wherein said clock means includes not more than one MOS integrated circuit ship and not more than one capacitor external to said chip.

4. A multiplex system as set forth in claim 1 wherein not more than two conductors exclusive of d.c. power and ground conductors interconnect the encoding means and the decoding means.

5. A multiplex system as set forth in claim 4 wherein said encoding means and said decoding means are interconnected by a first conductor carrying said timing signal and by a second conductor carrying said code signal.

6. A multiplex system as set forth in claim 2 wherein said encoding means and said decoding means are interconnected by a first conductor carrying said timing signal and by a second conductor carrying both the code signal and the turn on signal.

7. A multiplex system as set forth in claim 6 wherein the timing signal is a pulse chain, wherein the code signal is pulse number modulated, and wherein the turn-on signal is a d.c. level less than the pulse amplitude of the code signal.

8. A multiplex system as set forth in claim 5 wherein said timing signal is a pulse chain and wherein said code signal is pulse number modulated.

9. A multiplex system as set forth in claim 8 wherein said code signal comprises a plurality of pulses each of which corresponds to a timing signal pulse and further comprises a synchronization pulse which marks the start of each cycle of the code signal.

10. A multiplex system as set forth in claim 2 wherein said encoding means comprises an oscillator responsive to the positioning of certain of said operator actuatable controls or to said turn-on signal for providing said timing signal.

11. A multiplex system as set forth in claim 10 wherein said encoding means comprises counting means responsive to said timing signal for providing a counting code.

12. A multiplex system as set forth in claim 11 wherein said counting means comprises at least one ripple counter.

13. A multiplex system as set forth in claim 11 wherein said encoding means comprises logic means responsive to said counting code and to the positioning of certain if said operator actuatable controls for providing a logic code.

14. A multiplex system as set forth in claim 13 wherein said encoding means further comprises code conversion-generating means responsive to both the counting code and the logic code for generating said code signal.

15. A multiplex system as set forth in claim 1 wherein said decoding means comprises a front decoder for controlling components located near the front of the vehicle, a center decoder for controlling vehicle components located near the center portion of the vehicle, and a rear decoder for controlling vehicle components positioned near the rear portion of the vehicle.

16. A multiplex system as set forth in claim 2 wherein said decoding means comprises regulated voltage generation means responsive to the presence of said timing signal to switch the decoding means out of its standby mode of operation.

17. A multiplex system as set forth in claim 2 wherein said decoding means includes detection means responsive to both said timing signal and said code signal for providing a cycle start signal.

18. A multiplex system as set forth in claim 17 wherein said decoding means includes counting means responsive to said timing signal and said cycle start signal for providing a counting code.

19. A multiplex system as set forth in claim 18 wherein said counting means comprises a ripple counter.

20. A multiplex system as set forth in claim 18 wherein said decoding means includes programmed code conversion means responsive to said counting code for providing a control code.

21. A multiplex system as set forth in claim 20 in which said programmed code conversion means is constituted by a read-only memory.

22. A multiplex system as set forth in claim 20 in which said code signal is pulse number modulated and in which said decoding means further includes at least one data bit suppression means responsive to a corresponding feedback signal and to said control code for eliminating one of the pulses comprising said code signal.

23. A multiplex system as set forth in claim 20 in which said decoding means further includes memory means responsive to said timing signal, said code signal, and said control code for selectively providing a plurality of drive signals.

24. A multiplex system as set forth in claim 23 wherein said decoding means further includes driver means responsive to said drive signals for providing the outputs of the decoding means.

25. A multiplex system as set forth in claim 1 wherein said relay means comprises a plurality of relays such of which is responsive to one of the outputs of the decoding means for controlling energization of one of said vehicle components.

26. A multiplex system as set forth in claim 25 wherein at least one of said relays comprises a thermal relay having a resistive control element comprising a wire of a martensitic memory alloy.

* * * * *